United States Patent
Pierce

[19]

[11] Patent Number: 5,820,820
[45] Date of Patent: Oct. 13, 1998

[54] METHOD OF THERMALLY AND SELECTIVELY SEPARATING WATER AND OR SOLVENTS FROM SOLIDS UNDER VACUUM UTILIZING RADIANT HEAT

[76] Inventor: Brian N. Pierce, 1443 Rimrock Dr., Chico, Calif. 95928

[21] Appl. No.: 844,144

[22] Filed: Apr. 18, 1997

[51] Int. Cl.⁶ .................................................. A61L 2/00
[52] U.S. Cl. .......................... 422/22; 422/24; 426/242; 426/233; 356/300; 356/303
[58] Field of Search .................. 422/24, 22, 23; 426/242, 241, 233; 356/300, 303

[56] References Cited

U.S. PATENT DOCUMENTS

| | | | |
|---|---|---|---|
| 2,051,057 | 8/1936 | Pettit | 21/2 |
| 2,312,368 | 3/1943 | Smith | 21/102 |
| 2,428,090 | 9/1947 | Naeher et al. | 241/10 |
| 2,485,660 | 10/1949 | Robertson | 99/221 |
| 3,494,724 | 2/1970 | Gray | 21/54 |
| 4,015,341 | 4/1977 | McKinney et al. | 34/4 |
| 4,416,908 | 11/1983 | McKinney et al. | 426/241 |
| 5,213,830 | 5/1993 | Haagensen et al. | 426/237 |
| 5,380,189 | 1/1995 | Clary et al. | 426/438 |
| 5,382,441 | 1/1995 | Lentz et al. | 426/241 |
| 5,413,800 | 5/1995 | Bell et al. | 426/241 |
| 5,504,366 | 4/1996 | Weiss et al. | 73/863 |

*Primary Examiner*—Krisanne Thornton
*Assistant Examiner*—Fariborz Moazzam
*Attorney, Agent, or Firm*—Brinks, Hofer, Gilson & Lione

[57] ABSTRACT

A process for selectively dehydrating organic matter, and at the same time eliminating insects, larvae and insect eggs that are carried by the organic matter is provided. This process leaves the product free of all toxic chemicals. The process includes the use of selected narrow bands of infrared radiation. Narrow bands of infrared radiation are selected that most efficiently penetrate the product being processed. The color of the product, its physiological properties such as oil, sugar and water content are factors considered in the selection of the vacuum, temperature, and time of the process. The process is performed in a vacuum which reduces the vapor point of the target water or solvent contained in the product being processed and permits the process to be performed at a temperature that does not harm the product.

16 Claims, 2 Drawing Sheets

METHOD OF THERMALLY AND SELECTIVELY SEPARATING WATER AND OR SOLVENTS FROM SOLIDS UNDER VACUUM UTILIZING RADIANT HEAT

BACKGROUND OF THE INVENTION

The present invention relates generally to a dehydration process, and more particularly, to a process and apparatus for selectively dehydrating organic matter, and at the same time eliminating insects, larvae and insect eggs that are carried by the organic matter. The process thermally separates water and solvents from the organic matter. The terms "solvent" and "solvents" as used herein means any liquid other than pure water. This invention comprises the process of treating food and organic products under a vacuum with heat to causes rapid vaporization of water and solvents. As a result of performing the process under a vacuum the process of this invention is performed at a temperature that will not damage the product being processed.

The process of this invention causes the blood and other fluids present in pests, larva, and their eggs to evaporate. The process also causes liquid in the product to evaporate. As a result this invention leaves the product being processed free of pest and pest eggs that could have hatched, as well as reducing the moisture level of the product to a level that the product is suitable for storage, processing or packaging. The process focuses the radiant energy in narrow bands to which economizes on the energy used and avoids damage to the targeted product. The process is particularly adapted for processing fruits such as prunes and apricots, nuts and grains. After completing this process the product is cleaned to eliminate remnants of the dehydrated pests.

The process is performed under a vacuum since the boiling temperature of water decreases as the pressure decreases. For example, water would boil at thirty-two degrees Fahrenheit under a complete vacuum (29.11 inches of Hg). As a result, by performing the process under a vacuum, the internal fluids of pest's can be vaporized at temperatures that will not damage the products being processed.

Methyl Bromide has traditionally been used as a fumigant to control insects in growing and processing perishable fruits and vegetables. Methyl Bromide also has other agriculture uses for example to combat the growth of weeds in crops such as strawberries, tomatoes, peppers and eggplant.

Methyl Bromide is known to be toxic to humans and other non-target organisms. As a result its use is carefully controlled by government agencies such as the Environmental Protection Agency (EPA), Federal Insecticide, Fungicide and Rodenticide Act (FIFPA), and the U.S. Clean Air Act (CAA). The CAA has placed Methyl Bromide on its class I list as having an Ozone Depletion potential. As a result the production and importation of Methyl Bromide is slated to be eliminated in the U.S. by the year 2001. Acceptable alternatives for Methyl Bromide are needed. The present invention eliminates pest that have traditionally been controlled by Methyl Bromide, without the use of toxins.

This invention can be used to process food products that have not been treated with Methyl Bromide or other potentially dangerous chemical and eliminates any pest carried by the food product. The process does not leave a residue of hazardous substances on the processed food products.

The potential danger as a result of human ingestion of certain chemicals that are used as insecticides is difficult to ascertain with certainty. Often restrictions are placed on the use of a particular chemical, to avoid subjecting the public to a possible or potential danger.

There are known process for treating food products with radiation to eliminate pest and prepare the food for storage and or packaging.

A method of treating grain with microwave energy under a vacuum to kill insect, larvae and eggs, without extreme increases in the temperature of the grain is disclosed in U.S. Pat. No. 4,416,908.

The prior art also includes a process that is disclosed in U.S. Pat. No. 5,380,189 for dehydrating vegetative matter, such as grapes, in which the vegetative matter is placed in a chamber containing a heated liquid, at a temperature of not greater than 165/ Fahrenheit. A vacuum, of about 90 Torr, is created in the chamber after which the vegetative matter is submerged in the heated liquid. After a time period of 1–3 hours the vegetative matter is removed from the heated liquid and subjected to ambient atmospheric pressure.

A process for treating certain food products in which it is desired to raise the total surface temperature is disclosed in U.S. Pat. No. 5,413,800. This patent discloses a process of exposing the food product to a high intensity, short wave infrared heat source, for a short time period, which heats only the very outer surface of the food product.

A method of destroying pest by irradiation in the infrared radiation range of 770 to 2,600 nanometers, is disclosed in U.S. Pat. No. 2,051,057.

Electromagnetic radiation in either the infrared or microwave ranges could be used for dehydrating a product in a reduced atmosphere. However, for drying and the destruction of insect, eggs and larvae, the use of radiation in the infrared range has many advantages over radiation in the microwave range. The microwave range begins at the end of the infrared range and thus are longer waves. The use of microwaves are limited to 2 wave lengths 915 megahertz and 2450 megahertz by the Federal Communications Commission (F.C.C.), and thus the process of this invention, which requires the wavelength to be focused on the requirements of a particular product, is not feasible. The use of electromagnetic waves in the infrared range, which are shorter than those under the control of the F.C.C., will allow the use of electromagnetic waves that optically match the product as is necessary to practice this invention. Furthermore, microwaves have the disadvantage that they must be provided with special shielding to avoid health hazards and or very high vacuum to prevent ionization or arcing. The use of electromagnetic waves in the infrared range enables the use of the full spectrum heat to properly treat each product type and condition.

For the foregoing reasons there is a need for a process, that can be used for a variety of products. Such a process must be easily adjusted for the specific organic matter to be processed such that the process will dehydrate the organic matter to the desired level and at the same time eliminating pest that are carried by the organic matter.

SUMMARY OF THE INVENTION

The present invention is directed to a process for dehydrating food stuffs and organic matter under vacuum and heat using selected narrow band widths of radiation. The optical, electromagnetic, and physiological properties, in addition to the water content of the product to be processed are analyzed and taken into account in the selection of processing parameters. The maximum temperature that the products can tolerate, specific narrow wavelength range of infrared, visible, and or ultraviolet radiation that have been selected after analyzing the target product and the vacuum level at which the process is to be performed are all customized for the particular product being processed. The selection of such parameters is based on known properties of the organic matter and or on test conducted on samples of the actual organic product to be processed. The process will be customized to dehydrate the organic matter and also to eliminate pest that are carried by the organic matter.

The procedure of this invention considers the particular product, its type, and its size. The process includes the steps of determining the product's chemical, electromagnetic, physiological and optical properties, and the type of pest that it carries. Taking these factors into consideration the processing temperature is established. In selecting the processing temperature, the maximum temperature that the product can tolerate and the kill point of the particular pest are considered. With these parameters established the wavelength range of the radiant heat and time of exposure is established. For some products a continuous flow conveyor system can be used while for other products rotary or batch dryers are used. Products that are sticky or have a delicate nature must be handled in thin layered batches. The process is performed in a vacuum and the level of the vacuum has a bearing on the type of equipment that is used. If the maximum temperature that the product can tolerate is below 100° Fahrenheit then the vacuum must be relatively high. When high vacuums are necessary, getting the product in and out of the vacuum chamber, while minimizing the vacuum loss, is a consideration. At ultra high vacuums a batch processing system is often necessary. For products that can tolerate temperatures as high as 120° Fahrenheit, vacuums of around 26 inches of Mercury can be used. At this relative low vacuum a continuous processing systems can be used that has air locks that will permit the product to come in and out of the vacuum chamber with little loss of vacuum.

It is important that the product is exposed to a uniform heat at or above the vapor pressure of the internal fluids contained in the pest and eggs. The time of exposure to the infrared, visible, and or ultraviolet radiation is also critical and must be determined for the product being processed and the type of insect to be eliminated. The vacuum must be controlled and correlated with the temperature to insure that the desired vaporization takes place without damaging the product being processed. Also an energy source must be utilized that posses the versatility to be altered for the particular product being processed.

The low temperature vacuum drying used in this invention provides a substantial advantage over the conventional methods since in high temperature drying processes the oxidation takes place at a much faster rate. In a vacuum the oxygen level is much lower and lower temperatures can be used. As a result the flavor and vitamins of the product are retained. Within the interval of 20°–60° Centigrade the speed of oxidation of oil doubles each 15° Centigrade. The oxidation of vegetable oils emits obnoxious odors and results in a rancid flavor.

The present invention is directed to a process that provides advantages over the prior art since it is more efficient and thus uses less power and leaves the product being processed undamaged and free of all toxic chemicals.

Another advantage of this invention over the use of chemicals to eliminate pest is that pest cannot be shielded or hidden from a vacuum as they can from a chemical.

The present invention, together with further objects and advantages, will be best understood by reference to the following detailed description.

DETAILED DESCRIPTION OF THE PREFERRED EMBODIMENT

Figure 1:
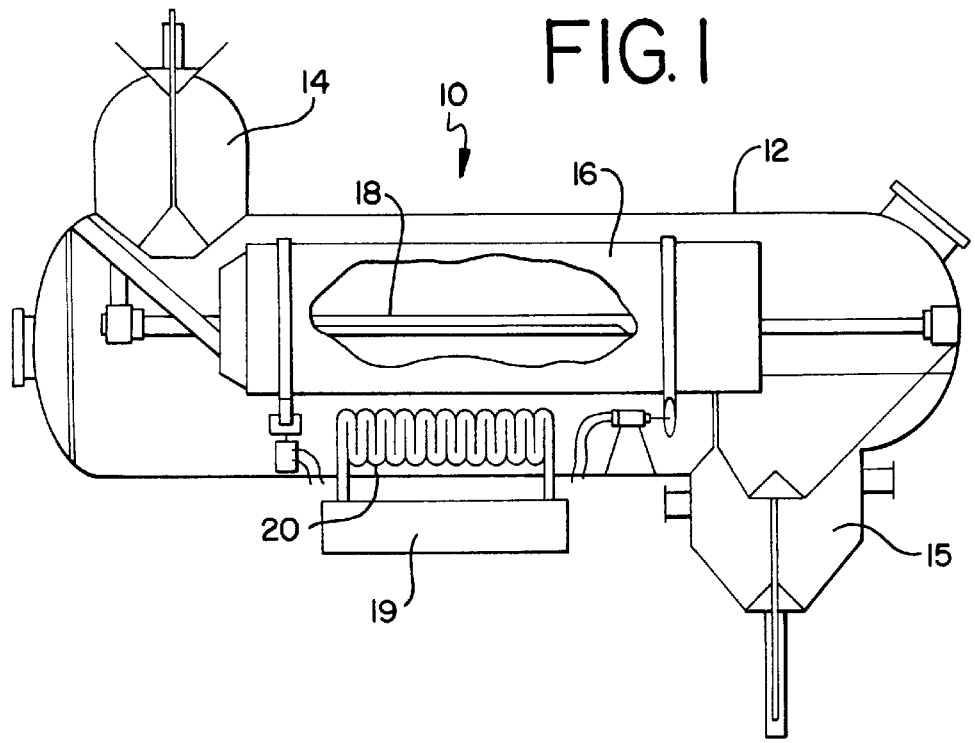
FIG. 1 is a sketch of a chamber, in which the air pressure can be reduced to a selected quantity, for performing the process of this invention.

Electromagnetic radiation is energy waves produced by the oscillation or acceleration of an electric charge in a magnetic field. Thus, such radiation has both an electric and a magnetic component. Light, heat, and radio waves are only part of the complete spectrum of electromagnetic radiation.

Electromagnetic radiation may be arranged in a spectrum that extends from waves of extremely high frequency and short wavelength to extremely low frequency and long wavelength. Frequency is the number of waves that pass a given point in a second. A wavelength is the distance from one wave crest to the next. The extremely high frequencies are associated with cosmic rays, whereas the extremely low frequencies are propagated by direct-current sources. In between in order of decreasing frequency are gamma rays; X-rays; ultraviolet, visible light, infrared, microwaves, long-wave radio, induction heating, and power waves. The wavelengths of electromagnetic radiation range from millionths of a centimeter to many kilometers. The properties of the different waves, along the spectrum, are important in determining heating effect, visibility, penetration, and other characteristics. Regardless of the frequency, wavelength, or method of propagation, electromagnetic waves travel at a speed of $3 \times 10^{10}$ cm (186,272 miles) per second in a vacuum. All the components of the electromagnetic spectrum, regardless of frequency, also have in common the typical properties of wave motion, including diffraction and interference.

Electromagnetic radiation is one way in which energy may be transmitted, and unlike other methods of transmitting energy it needs no material medium for transmission. As a result electromagnetic radiation is a desirable method to transmit energy in a reduced atmosphere environment.

Electromagnetic radiation, in the wavelength range from 10 to 1,000,000 nanometers (1 millimeter), is used in the practice of this invention. This range spans the ultraviolet, visible light and infrared ranges. Each region within this wavelength range offers different effects, which differ farther depending upon whether they are falling on water, solvent, solid or semisolid. The long wavelengths of the far infrared region affect water molecules in a similar fashion as do microwaves. However, by utilizing the far infrared waves, rather than microwaves, the difficulties of shielding and arcing are not encountered. Mid range infrared has the advantage, of varying degrees of penetration and vibrational excitement, when encountering water molecules. The near infrared region provides rapid deep penetration. The visible light range also provides deep penetration and other special optical properties that are beneficial to the practice of this invention. The ultraviolet band is utilized mainly for its germicidal effects. As a result of utilizing selected narrow ranges within the wide range, that extends from 10 to 1,000,000 nanometers nanometers, optimum dehydration and precision kill is achieved at a high efficiency.

Low frequency infrared waves have peaks that highly excite water and solvent molecules and thus will aid in drying the product and killing pest that are carried by the product. The temperature boundaries for a particular product should be determined after considering the chemical and physiological properties of the product, such as oil and sugar content as well as other attributes such as delicate substance tissues. The vacuum and temperature set point must be calculated to directly correlate with the kill point and or drying requirements. These calculations must also take into consideration the wavelength source, filter and depth of penetration requirements of the particular product being processed.

Information is available from the U.S. Department of Agricultural for products to be processed by this invention. This information can be identified in publications such as "The MERCK INDEX" and "FOOD SCIENCE & TECHNOLOGY" which is a USDA Publication. This information identifies the various oils, sugars, and other delicate substances that are included in a product and the maximum temperature that these ingredients can be exposed to without damage. This source of information also provides the temperature at which for example a specific oil contained in a product will oxidize and become rancid. This temperature, and vapor pressure information are the initial information relied upon to insure that the maximum temperature that the product is exposed to during processing will not damage the product or its ingredients.

Infrared radiation is defined as electromagnetic radiation of wavelengths between 0.8 to 1.000 micrometers. Infrared radiation bridges the gap between the longest visible light wavelengths and the shortest microwave wavelengths. Infrared wavelengths are usually expressed in Micrometers, Nanometers or Angstroms. One micrometer is a millionth of a meter and 1,000 micrometers is one millimeter which is equal to 0.04 inches. Infrared radiation is invisible to the human eye however it transmits energy and has the ability to raise the temperature of an object that it passes through. The following is the infrared radiation range expressed in Micrometers, Nanometers and Angstroms:

| .8 | to | 1,000 | Micrometers | (nm) |
| 800 | to | 1,000,000 | Nanometers | (nm) |
| 8,000 | to | 10,000,000 | Angstroms | (A) |

Infrared radiation can be divided into the following sub regions:

| Very short | 0.8 to 1 | Micrometers |
| Near | 1 to 5 | Micrometers |
| Mid | 5 to 50 | Micrometers |
| Far | 50 to 1,000 | Micrometers |

Visible light has the following relevant sub region:

| Red - Violet | 3900 to 7600 | Angstroms |

Ultraviolet radiation is defined as electromagnetic radiation of wavelengths between 40 and 4,000 angstroms. The following is the ultraviolet radiation range expressed in Micrometers, Nanometers and Angstroms:

| 0.004 | to | 0.4 | Micrometers |
| 4.0 | to | 400 | Nanometers |
| 40 | to | 4,000 | Angstroms |

Ultraviolet radiation bridges the gap between the longest X-ray wavelengths and the shortest visible light wavelengths. Ultraviolet radiation has therapeutic, biological and germicidal applications. The germicidal effect of ultraviolet light are well established for fungi, spores and viruses. This invention utilizes Ultraviolet radiation at a wavelength of 2,537 Angstroms for germicidal application. The application of ultraviolet radiation at 2,537 Angstroms is used to kill organisms on the surfaces and suspended in air or liquid. This application of ultraviolet radiation is used for example in the processing and packaging of foods by directing ultraviolet lamps on the products and their containers. Ultraviolet radiation at 2,537 Angstroms is also used to sterilize the air where food and drugs are processed and packaged to prevent the contamination of the product by bacteria or molds. This application of ultraviolet radiation is also effective to prevent the spread of airborne diseases. As a result of exposing the product to the germicidal wavelength of 2,537 angstroms this process will destroy fungi, spurs and mold. Thus, this process will completely replace the use of methyl bromide in product treatment processes.

The process of this invention utilizes radiant heat. Thus the effect of radiant heat on pests and organic products and particularly their internal fluids are of importance in the application of this invention.

Another property of radiant heat that is applied in the practice of this invention is its ability to penetrate beneath the surface of an object at which it is directed. This property of radiant heat is dependent upon wavelength. Whenever electromagnetic waves fall upon any material substance, they are in general partly reflected, partly transmitted, and partly absorbed. The part that is absorbed either makes some permanent change in the structure of the absorbing substance or is transformed into heat. If it is transformed into heat, it warms the absorbing substance and increases its temperature.

Infrared radiation transmits energy and has the ability to raise the temperature of an object that it passes through and it does not heat the air between the radiator and the product being processed. Also a portion of the radiation in the infrared wavelength range penetrates the surface of the product being processed and thus heats the interior thereof. The use of infrared as the major heat source in this invention is based upon the advantages derived as a result of the ability of infrared waves to excite water and solvent molecules that are present in pests and in the product being processed. Thus, the infrared radiation causes vaporization of the water and solvents. Infrared waves are a very expedient method of transmitting energy when it is important to focus on a particular narrow wavelength band.

The infrared rays pass through the product that is contained in the vacuum chamber and causes a rapid heat increase. There is shown in FIG. 1 an embodiment of a vacuum chamber 10 that could be used with this invention. The vacuum chamber 10 disclosed in FIG. 1 is a continuous processing type chamber. Chamber 10 includes an air tight outer tank 12 having a feed hopper air lock 14, through which product is introduced into the vacuum chamber 10, secured thereto. Outer tank 12 also has a discharge hopper air lock 15, through which product is removed from the vacuum chamber, secured thereto. A dehydration drum 16 is mounted for rotation within the outer tank 12 that has energy emitters 18 therein. A refrigeration unit 19 is provided for the condensers 20 located within the vacuum chamber that functions to maintain a low moisture level. In the vacuum environment, the boiling point of the water and solvent is reduced, and the water and solvents are thus evaporated at or above its reduced boiling point. The vacuum in the vacuum chamber is controlled to reduce the temperature at which the liquids boil to a level that will not damage the product being processed. Pest and their eggs are destroyed by the vaporization of internal water, blood and other solvents, contained in the pest and eggs, as well as the rapid change in their environment.

Condensers 20 are provided in the vacuum chamber to remove moisture to thus maintain a high moisture gradient or descent, which accelerates dehydration of the product being processed and the pests carried thereby. The resulting rapid change in the pest's environment and their moisture content causes tissue rupture in the pests and eggs. This process allows for low temperature vaporization of the pest internal fluids resulting in a complete elimination of the pest without the use of toxins.

A broad spectrum of infrared waves results in high surface heat, low efficiency and higher than needed product temperature. On the other hand, narrow band waves are efficient and provide precise temperature control. Selected bands of infrared radiation are optimum for drying product and eliminating pest especially when the process to be performed only required that the pest be killed and the product cleaned. Thus, it is necessary to determine the wavelength band that is most efficiently absorbed by the particular product being processed. The selection of the wavelength band that will be most efficiently absorbed depends upon the infrared characteristics of the material being processed.

The depth of penetration of radiation in different spectral regions differs considerably. The following table shows penetration depths, in millimeters, for regions of ultraviolet rays, visible light and infrared rays in the human skin. This invention does not involve directing radiation at human skin, however similar penetration depths have been found in test on soft fruits and vegetables.

| SPECTRAL REGION | WAVELENGTH (A) | PENETRATION |
|---|---|---|
| far ultraviolet | 1,800–2,900 | superficial 0.01–0.1 |
| near ultraviolet | 2,900–3,900 | superficial 0.10–1.0 |
| visible light | 3,900–7,600 | deep 1.00–10.0 |
| near infrared | 7,600–15,000 | deep 10.0–1.0 |
| far infrared | 15,000–150,000 | superficial 1.0–0.05 |

The surface reflection of electromagnetic waves is a factor of both the particle size of the substance from which the surface is formed and the wavelength. The penetration of electromagnetic waves below the surface is a factor of the random and or uniform distribution of the particles of the material being penetrated. Thus, the particular material being processed has its own unique characteristic for reflecting and absorbing light.

To determine the wavelength, or combination of wavelengths that will provide the most efficient energy transfer for kill and or dehydration, both the product and the pest must be evaluated. The parameters that must be considered are the contents of the product and pest such as oil (and its states), sugars, moisture and liquid, and their location within the product.

The visible light and near infrared spectrum of the product being processed must be determined before initiating the process of this invention. These optical characteristics can be ascertained in several ways.

The amount of light absorbed can be determined using the Kubelka-Munk theory that is discussed in Reflectance Spectroscopy by W. Wendlandt and H. Hecht, Interscience Publisher, N.Y. 1966, pp 56–63. This theory can be used for determining the amount of light that is absorbed and the penetration depth. Kubnelka and Munk derived equations that describe the diminution of light intensity within a sample due to scattering and absorption. These equations are derived in terms of two arbitrary constants, the absorption index "K" and the scattering index "S". A wavelength dependent penetration depth $\beta_p$ can then be calculated according to the following formula:

$$\beta_p = 1(K(K+2S^2)^{2/3}$$

However, the Kubelka-Monk theory assumes consistent layers and particle size. Thus, it is difficult to obtain accurate results for products in which the layers and the particle size are inconsistent.

A preferred method for determining the wavelength, or combination of wavelengths that will give the most efficient energy transfer for kill and/or dehydration is spectroscope. The science of spectroscopy can be used to determine the chemical content of a sample by recording its absorption reflectance, or transmittance per wavelength. Spectroscopy utilizes the phenomenon that when a ray of light passes from one transparent medium, such as air, into another, such as glass or water, it is bent. Upon reemerging into the air, it is bent again. This bending is called refraction. The amount of refraction depends on the wavelength of the light. A spectroscope is a device for producing and observing a spectrum visually. A spectrum can be observed and recorded photographically and the result is a spectrograph. Spectrographs are available throughout the ultraviolet and visible regions of the spectrum and into the far infrared region. A sample of the product and the pest carried by the product is processed by the spectroscope. The result from the spectroscope shows a graph in which the spikes represent the high absorption areas. The spikes on the spectrographs are examined to located available energy sources. We then targeted our energy input for heating around these areas.

After determining the optical and electromagnetic properties of the target product the optimum infrared wave length for the depressed vapor point of the target water or solvent is established. The spectrograph spikes serve as a starting point for radiant heat. It has been found that when the wavelength of these spikes is maintained for a time period high surface temperatures develop. This is a result of the energy being absorbed very quickly and very well which causes its penetration to be limited to the first several centimeters of the product. Thus, as the product dries and conduction diminishes it has been found that it is advantageous to move off the peaks to thereby increase depth of penetration. By operating just off the peak, either above or below, greater penetration is accomplished. Power will be reduced as the product moves through the chamber. Thus, this invention accommodates the product requirement changes as its moisture content lowers and its evaporative cooling slows. By utilizing wavelengths that are just off the peaks, better penetration of the product has been obtained. Thus, available energy sources and highest energy input are located by the spectrograph which are then varied on both sides of the peak to obtain desired penetration.

U.S. Pat. No. 5,510,894 discloses a spectroscopic apparatus and method of examining a sample. U.S. Pat. No. 5,504,366 discloses spectroscopy system for analyzing surfaces of samples.

When it is desired, in processing a product, to only kill the pest and clean the product, and not dry or dehydrate the product, then wavelengths that have less than 60% of the product's match waves and waves that match the target pest's color and solvent are required.

After determining the optical properties of the product being processed and the temperature level that the product can tolerate without being damaged, the temperature required to kill pest that may be carried by the product must be determined. After this has been factored in, a vacuum level for the process can be calculated and the optimum infrared wavelength for the depressed vapor point of the target water or solvent can be established. Infrared rays which fall into the range between 800 and 1,300 nanometers are most effective for heating beneath the product surface. Infrared wavelengths between 800 and 1,000 nanometers offer good penetration with minimal surface heat. Infrared wavelengths above 1,500 nanometers will give high surface heat with minimum penetration. Products with high water content transfer heat well and penetration is less important especially in the early stage of drying. Pest and free water located at the surface of the target product can be quickly flashed off with infrared wavelengths that have minimal penetration.

The micro boiling point or micro vapor pressure are the terms used to describe the boiling point of a very small sample of a product to determine the point at which a substance converts to a gaseous state. The sample could be the pest that is carried by the product or samples from various layers of the target product itself. Thus, the terms are used for both the product and for pest carried by the product. The micro boiling point or micro vapor pressure will be depressed or lessened as a result of operating the process in a vacuum.

Figure 2:
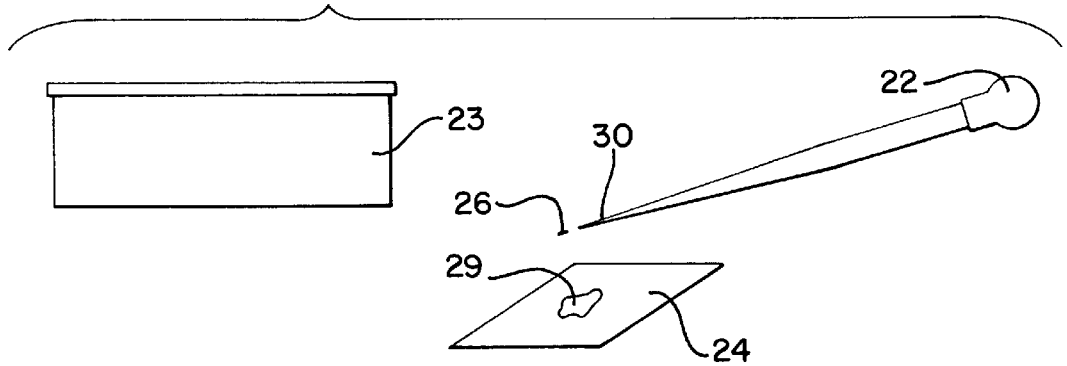
FIG. 2 is an embodiment of a micro pipette used in the practice of this invention.

The vapor pressure for each liquid in a product is determined by utilizing a device that can include an oil bath and a micro pipette sample holder, or micro test tube. The micro pipette sample holders are constructed of glass tubing. The micro pipette sample holder shown in FIG. 2 has a jet tip 30 at one end and a rubber bulb 22 at the other end. Small liquid samples 29 can be collected with the pipette from slides 24, by squeezing the rubber bulb 22. The jet tip is placed in the sample of the product to be tested and the bulb is released. The sample is thus drawn into the sample holder. After a sample has been sucked in through the tip 30, the tip is closed with a stopper 26.

Figure 3:
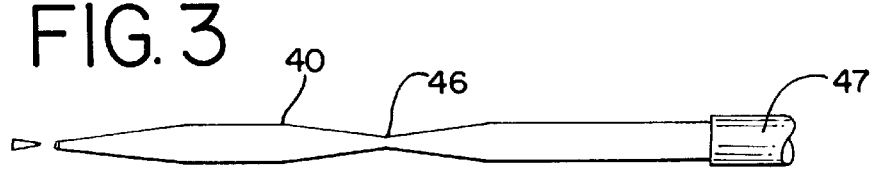
FIG. 3 is another embodiment of a micro pipette used in the practice of this invention.

Another type of micro pipette, is shown in FIG. 3, that has a larger sample chamber 40 and a reduced suction section 46. A tube 47 extending from a vacuum source can be connected to the reduced section.

Figure 4:
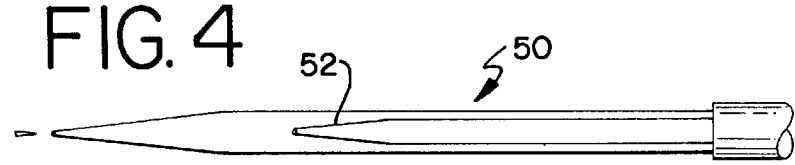
FIG. 4 is another embodiment of a micro pipette used in the practice of this invention.

Still another type of micro pipette 50, shown in FIG. 4, includes a micro thermometer 52 in the sample chamber. This type of micro pipette can be used with an oil bath or direct radiant heat of a desired wavelength. A vacuum source is connected to the pipette 50 in place of the rubber bulb. Samples are heated and visually monitored to ascertain the temperature at which the sample vaporizes at a predetermined vacuum level. The vacuum level may be atmospheric or below atmospheric. The vacuum and or the temperature can be varied when using this type of micro pipette holder. Varying these parameters permits full range testing. The pipettes can be used to draw samples of the actual pest and or their eggs into the holder.

Figure 5:
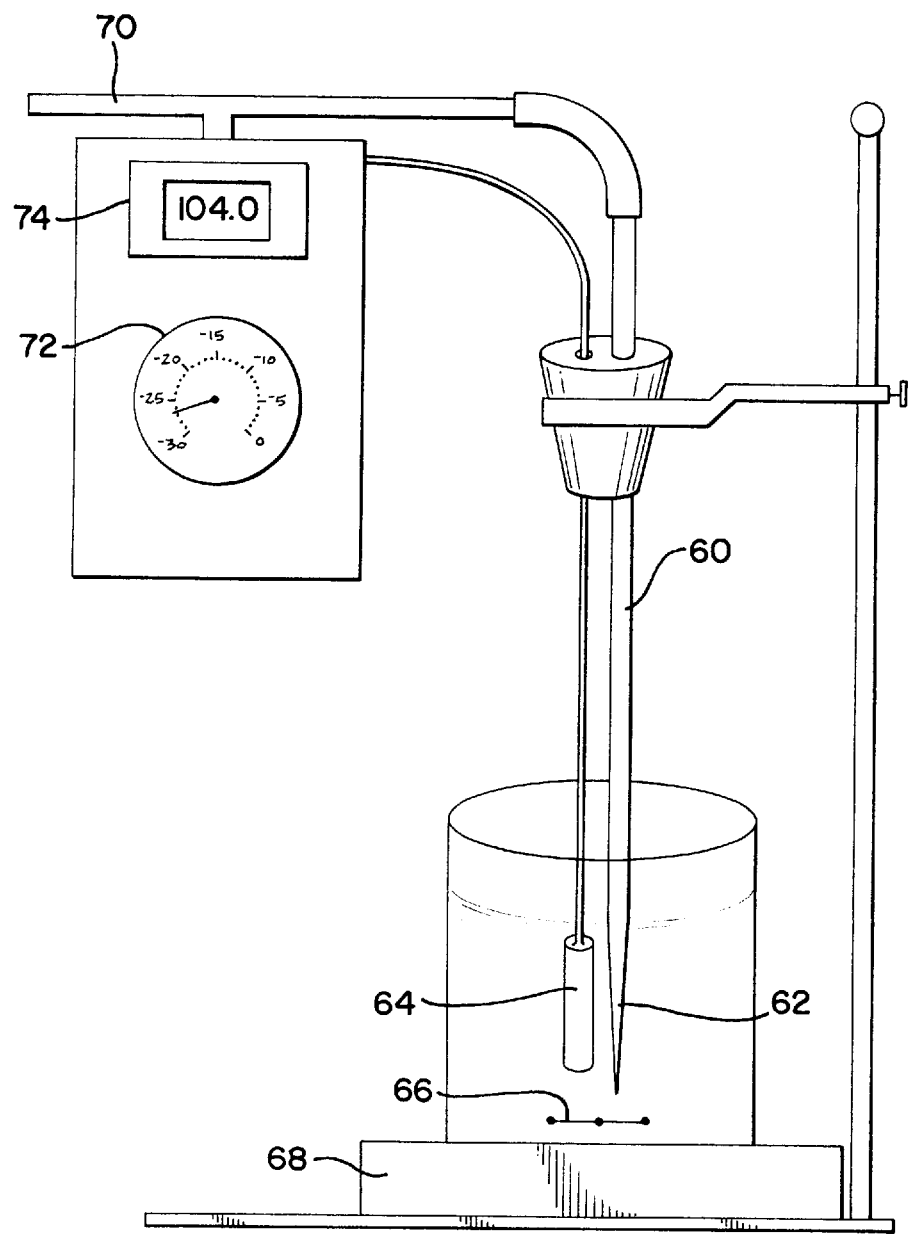
FIG. 5 is an illustration of an apparatus for testing a sample at various vacuum levels.

In the apparatus shown in FIG. 5 fluid from the pest or their eggs is drawn into a micro pipette holder 60. The apparatus includes a temperature probe 64, a magnetic stir bar 66 that is activated by a magnetic stir plate 68. The micro pipette holder 60 is connected to a vacuum source 70 and a vacuum gauge 72. The temperature probe 64 is connected to a gauge 74. The sample 62 would be tested at atmospheric pressure, increasing the temperature until the sample vaporizes. Additional test would be performed at several vacuum level, for example at 13, 18, 20, 25 and 28 inches of Mercury. This information would then be plotted to produce a kill curve for the particular pest. The pest and their eggs can be observed to determine the condition of the eggs and tissue as the temperature raises.

The process of this invention, under some conditions, requires the application of radiation at multiple wavelength. This occurs when, for example, simultaneous drying and kill are desired.

The following examples show the side variation in wavelengths, vacuums and temperatures that are used in the process of this invention. This wide range is a result of focusing on the optical, physiological, and water content of the product being processed.

EXAMPLE 1

|  | fresh prune | dry prune | rehydrated prune |
| --- | --- | --- | --- |
| color | purple | dark purple | red purple |
| % H$_2$O | 75% | 18% | 30% |
| dry or kill time | dry time 6 hrs. | kill time 1 minute | kill time 3 minutes |
| wavelength | 1,000 nm | 10,000 nm | 1,500 nm |
| temp. | 100° F. | 75° F. | 150° F. |
| Vacuum | 70 TORR | 10 TORR | 40 TORR |

This Example illustrates the large variations of wavelengths, vacuum and temperature that are used in this process to accommodate different optical properties, physiological properties and moisture content present in the product being processed.

EXAMPLE 2

This example will discuss the process that would be followed if a supply of Almonds were received with an order to dry the product and eliminate any pest carried by the product.

The product, Almond, would be looked up in the Merck Index and the USDA Publication. From this we learn what oils and sugars are contained in the product. Based upon this information we learn that 120 degree Fahrenheit will be the maximum temperature that the product should be exposed to. We also know that the product contains water which vaporizes at 212° Fahrenheit. Thus it will be necessary to perform the process under a vacuum that will lower the boiling point of water to 120 degrees or less.

Samples of the product would then be examined to locate and identify any pest, larva or eggs that it may be carrying. The pest, larva or eggs would be drawn into a micro test tubes. The samples would be run through a series of test starting at atmospheric pressure and then at progressively higher vacuums. At each step the temperature at which the sample vaporized would be recorded. These temperatures are plotted against the vaporization pressures which would result in a curve showing the pressures and temperatures at which the pest, larva and eggs could be vaporized. Since we know that our maximum temperature for this product is 120 degree Fahrenheit the curve would be developed into the area where the temperatures were below the maximum. We would also learn in this test where in the product the pest, larva, and eggs are located. This is important because an energy source must be selected that will produce a sufficient temperature rise in the location of the pest.

Samples of the product and liquid from the product would also be drawn into micro test tubes and a series of test performed on these samples. Curves would be developed for these product samples. Different liquids or solvents will be found at different locations of the product. The location of each solvent must be noted so that an energy source can be selected that will penetrate to the necessary depth in the product.

Spectroscopy test would be conducted on the surface of the product to identify wavelengths that will be absorbed by this particular product. Spectrographs in the visible light range, ultraviolet range and infrared range could be obtained. The ultraviolet range is particularly useful for eliminating pest from the product and the infrared range is particularly useful for drying the product.

Using the data that has been collected the necessary energy sources that will be required to process the product are now selected. If we know that there is a liquid concentration or pest present at a certain level below the surface of the product then an energy source must be selected that will penetrate to that depth, or moisture will permit conduction of heat to that depth, and will raise the temperature to the level necessary to kill the pest and or vaporize the liquid. The product is placed in the processing machine and exposed to the energy source while the temperature of the product is recorded. From this data the processing time can be calculated.

Finally the type of processing equipment to be used must be selected. For our Almond product, since we have a relatively high maximum allowable temperature, the processing vacuum can be relatively low. The relatively low vacuum allows the use of a continuous process with air locks to bring the product into and out of the low pressure area of the processing equipment.

All parameters now having been established the complete batch of product is now processed.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A method of dehydrating organic material, which may optionally be carrying pest, in a processing zone, comprising the steps of:
   (a) determining a maximum temperature that the material can be exposed to without damage to the material;
   (b) determining a visible light and near infrared surface spectrum of the material;
   (c) identifying high absorption wavelengths on the material surface;
   (d) determining a wave penetration depth for the high absorption wavelengths;
   (e) determining a depth from the surface of the material where moisture layers of the material are located;
   (f) determining the micro boiling point for the moisture layers of the material;
   (g) selecting wavelength bands from the identified high absorption wavelengths that will penetrate the material to the depth where moisture layers of the material are located;
   (h) selecting a vacuum level that will reduce the micro boiling point to a temperature below the maximum temperature that the material can be exposed to; and
   (i) exposing the material to radiation at the selected wavelength bands and vacuum level in a processing zone to obtain a dehydrated organic material.

2. A method of dehydrating organic material as set forth in claim 1 and including the following additional step:
   (j) providing means for transporting the material to and from the processing zone.

3. A method of dehydrating organic material as set forth in claim 1 and including the following additional steps that are performed before steps (h) and (i):
   (g1) determining a visible light and near infrared surface spectrum of the pest;
   (g2) identifying a high absorption wavelength of the pest;
   (g3) determining a micro boiling point for solvents contained in the pest;
   wherein the selected wavelength bands of step (i) include the high absorption wavelength of the pest and the exposing step results in destroying pest.

4. A method of dehydrating organic material as set forth in claim 3 and including the following additional step:
   (j) providing means for transporting the material to and from the processing zone.

5. A method of dehydrating organic material as set forth in claim 1 and including the following additional steps:
   (j) taking spectrographs of a surface and of high moisture samples of the material;
   (k) identifying high moisture wavelengths of the material surface and the high moisture samples from the spectrographs.

6. A method of dehydrating organic material as set forth in claim 5 and including the following additional step:
   providing means for transporting the material to and from the processing zone.

7. A method of dehydrating organic material as set forth in claim 6 and including the following additional steps that are performed before steps (h) and (i):
   (g1) determining a visible light and near infrared surface spectrum of the pest;
   (g2) identifying a high absorption wavelength of the pest;
   (g3) determining a micro boiling point for solvents contained in the pest;
   wherein the selected wavelength bands of step (i) include the high absorption wavelength of the pest and the exposing step results in destroying pest.

8. A method of dehydrating organic material comprising the steps of:
   obtaining a spectrograph of a sample of the organic material;
   determining a wavelength of a spike on the spectrograph;
   exposing the organic material to radiation having a wavelength that is substantially equal to said spike wavelength such that the material is dehydrated.

9. A method of dehydrating organic material as set forth in claim 8 and including the following additional step:
   exposing the organic material to radiation having a wavelength that is lower than said spike wavelength.

10. A method of dehydrating organic material as set forth in claim 8 and including the following additional step:
    exposing the organic material to radiation having a wavelength that is greater than said spike wavelength.

11. A method of dehydrating organic material comprising the steps of:
    obtaining a spectrograph of a sample of an organic material;
    determining a wavelength of a spike on the spectrograph;
    exposing the organic material to radiation having a wavelength that is lower than said spike wavelength such that the material is dehydrated.

12. A method of dehydrating organic material comprising the steps of:

obtaining a spectrograph of a sample of an organic material;

determining a wavelength of a spike on the spectrograph;

exposing the organic material to radiation having a wavelength that is greater than said spike wavelength such that the material is dehydrated.

13. A method of killing pests that are carried by organic material comprising the steps of:

obtaining a spectrograph of the pest carried by the organic material;

determining a wavelength of a spike on the spectrograph;

exposing the organic material to radiation having a wavelength that is greater than said spike wavelength such that the pests are killed.

14. A method of killing pest that are carried by organic material comprising the steps of:

obtaining a spectrograph of the pest carried by the organic material;

determining a wavelength of a spike on the spectrograph;

exposing the organic material to radiation having a wavelength that is substantially equal to said spike wavelength such that the pest are killed.

15. A method of killing pest that are carried by organic material comprising the steps of:

obtaining a spectrograph of the pest carried by the organic material;

determining a wavelength of a spike on the spectrograph;

exposing the organic material to radiation having a wavelength that is lower than said spike wavelength such that the pest are killed.

16. A method of killing pest that are carried by organic material comprising the steps of:

obtaining a spectrograph of the pest carried by the organic material;

obtaining a spectrograph of a surface of the organic material;

determining wavelengths of spikes on the spectrographs;

exposing the organic material to radiation having a wavelength that is no greater than 60% of the spikes on the spectrograph of the organic material surface and approximately equal to the spikes on the spectrograph of the pest carried by the organic material such that the pest are killed.

* * * * *